(12) United States Patent
Poutievski et al.

(10) Patent No.: US 8,989,194 B1
(45) Date of Patent: Mar. 24, 2015

(54) SYSTEMS AND METHODS FOR IMPROVING NETWORK REDUNDANCY AND FOR FACILE INITIALIZATION IN A CENTRALLY-CONTROLLED NETWORK

(71) Applicant: Google Inc., Mountain View, CA (US)

(72) Inventors: Leon Poutievski, Santa Clara, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 13/718,646

(22) Filed: Dec. 18, 2012

(51) Int. Cl.
*H04L 12/28* (2006.01)
*H04L 12/24* (2006.01)

(52) U.S. Cl.
CPC ..................................... *H04L 41/12* (2013.01)
USPC ....................................... 370/395.2; 370/360

(58) Field of Classification Search
USPC ................................ 370/235, 360, 392, 395.2
See application file for complete search history.

(56) References Cited

U.S. PATENT DOCUMENTS

| | | | | |
|---|---|---|---|---|
| 8,830,823 | B2 * | 9/2014 | Koponen et al. | 370/219 |
| 2011/0317701 | A1 * | 12/2011 | Yamato et al. | 370/392 |
| 2012/0281698 | A1 * | 11/2012 | Forster et al. | 370/392 |
| 2013/0028070 | A1 * | 1/2013 | Beheshti-Zavareh et al. | 370/217 |
| 2013/0028142 | A1 * | 1/2013 | Beheshti-Zavareh et al. | 370/255 |
| 2013/0132531 | A1 * | 5/2013 | Koponen et al. | 709/220 |
| 2013/0148498 | A1 * | 6/2013 | Kean et al. | 370/230 |
| 2013/0223277 | A1 * | 8/2013 | DeCusatis et al. | 370/254 |
| 2013/0230047 | A1 * | 9/2013 | Subrahmaniam et al. | 370/392 |

OTHER PUBLICATIONS

Philavong et al., "Network System and Network Redundancy Method", WO/2011/083785 (machine translation), Jul. 14, 2011.*
McKeown et al., "OpenFlow: Enabling Innovation in Campus Networks", Mar. 14, 2008, Open Networking Foundation, pp. 1-6.*

* cited by examiner

*Primary Examiner* — Paul H Masur
*Assistant Examiner* — Michael Phillips
(74) *Attorney, Agent, or Firm* — Edward A. Gordon; Foley & Lardner LLP (57) ABSTRACT

A network topology system for combining in-band hardware links for network redundancy with out-of-band hardware links for facile initialization in a network with centralized control architecture, wherein the combined use of in-band and out-of-band hardware links further reduces the overall hardware links required for centralized control. An initialization processor allows direct out-of-band hardware links between a plurality of centralized controllers to be used for initialization, while further allowing in-band hardware links for connections between two switches, and between a switch and a controller, wherein the use of in-band hardware links allows the same hardware links to convey both data and control communications, increasing redundancy, and reducing the number of hardware links required by the network domain as a whole.

21 Claims, 8 Drawing Sheets

| 502 → | CONTROLLER LOOKUP TABLE | |
|---|---|---|
| 504 → | CONTROLLER ID | TIMESTAMP ← 506 |
| 110 → | CONTROLLER | NULL ← 513 |
| 115 → | CONTROLLER | TIME ← 518 |
| 120 → | CONTROLLER | TIME ← 520 |

| 508 → | SWITCH LOOKUP TABLE | |
|---|---|---|
| 510 → | SWITCH ID | TIMESTAMP ← 512 |
| 130 → | SWITCH | TIME ← 514 |
| 135 → | SWITCH | TIME ← 516 |

Fig. 5C

| CONTROLLER LOOKUP TABLE | |
|---|---|
| CONTROLLER ID | TIMESTAMP |
| CONTROLLER 110 | NULL |
| CONTROLLER 115 | TIME |
| CONTROLLER 120 | TIME |

| SWITCH LOOKUP TABLE | |
|---|---|
| SWITCH ID | TIMESTAMP |
| SWITCH 130 | TIME |
| SWITCH 135 | TIME |
| SWITCH 140 | TIME |

Fig. 5D

SYSTEMS AND METHODS FOR IMPROVING NETWORK REDUNDANCY AND FOR FACILE INITIALIZATION IN A CENTRALLY-CONTROLLED NETWORK

TECHNICAL FIELD

The systems and methods described herein relate to network topology, and particularly, to combining in-band hardware links for network redundancy with out-of-band hardware links for facile initialization in a network with centralized control architecture.

BACKGROUND

A network system includes the hardware, and supporting software, necessary to transmit information between computers. One can distinguish between a physical hardware link between two network nodes (computers, switches, routers, and controllers, among others), and a software connection, which refers to an established communication channel between nodes that allows transmitted information to be understood at both transmission and receiver ends. This is achieved by having a common routing policy, and implies that two nodes may be linked by hardware, but unable to connect or communicate until an initialization procedure has been carried out to establish a communication channel.

A link may refer to the physical hardware used to join network nodes, and a network may be a shared local area network (LAN), wide area network (WAN), metropolitan area network (MAN), the Internet, or any other type of network or communication system suitable for transferring information between computer systems. Ethernet is a common family of technologies using the IEEE standard 802.3 for local area networking (LAN), and Ethernet network hardware links (the physical layer) commonly use a Category 5 (Cat 5) twisted pair Ethernet cable. Alternative hardware link types include coaxial cables, twisted pair cables categorized in order of increasing bandwidth from category 1 to category 7, optical fiber cables, or any other conductor capable of facilitating communication between two network nodes. Hardware links make up a large amount of the total hardware required to implement a network. Reduction in the number of links is desirable from a number of standpoints, including a capital cost savings in the setup of the network and replacement of cabling after failure, and a reduction in the complexity associated with manually ensuring hardware links are connected correctly.

The operation of network nodes can be conceptually divided between a data-plane and a control-plane, wherein the data-plane comprises the physical hardware necessary to forward data packets through a piece of network hardware, and the control-plane comprises the software that analyzes data packets arriving at, for example, a switch port, and executes certain redirection processes in response to the data packet's arrival. The control-plane maintains a routing table, listing all network addresses reachable from the given switch, and instructs the data-plane as to how to forward the data packet.

A centrally-controlled network, otherwise referred to as a software-defined network, is a methodology that allows for centralized control of a network of nodes from a dedicated hardware server, referred to as a centralized controller. Alternatively, a network may implement logically-centralized control of a network of nodes, wherein a logically-centralized controller may be implemented as distributed processes across multiple different central processing units (CPUs) in multiple servers. To implement centralized control, the control-plane is removed from the individual switches and routers, and replaced by an OpenFlow agent, which allows for remote control from a global control plane (otherwise referred to as a centralized controller, or simply as a controller).

An OpenFlow switch is an example of a network node that is controlled from a centralized controller. An OpenFlow switch consists of, among other things, a flow table, which stores rules as to how the switch will process incoming packets, a secure channel that connects to the global control plane, and the OpenFlow protocol that enables a centralized controller to communicate with the switch. A centralized controller, by using the OpenFlow protocol, can remotely program switch flow tables, send packets to any switch port, and receive packets from any switch port. Methodology for centralized control is described by OpenFlow, at www.openflow.org.

The devices that make up a centrally-controlled network may conventionally be connected by out-of-band hardware links, such that any two network nodes, which may include switches and routers, are connected by data-carrying out-of-band hardware links. Additionally, each network node is connected to a centralized controller, and each centralized controller is directly connected to other centralized controllers, by control information-carrying out-of-band hardware links. This methodology, while simple to initialize due to the direct connection between centralized controllers, has the disadvantage of an inherent lack of redundancy. For example, a failure of an out-of-band hardware link conveying control information between a network node and a centralized controller results in the network node being unreachable to control instructions.

As such, there is a need for improved systems and methods for increasing the redundancy, and for facilitating simple initialization, of a centrally-controlled network.

SUMMARY

The systems and methods described herein include, among other things, a network topology system for combining in-band hardware links for network redundancy with out-of-band hardware links for facile initialization in a network with centralized control architecture, wherein the combined use of in-band and out-of-band hardware links further reduces the overall hardware links required for centralized control.

In one aspect, the systems and methods described herein include a network system with a centrally-controlled network that has a first centralized controller and a second centralized controller that can control a network node. The first and second centralized controllers, in addition to the network node, are in a sub-set of network hardware referred to as a network domain. The first and second centralized controllers may be connected to the network node by a plurality in-band network hardware links, and to one another by an out-of-band network hardware link. The network node advertises its network address location to the first and the second centralized controllers by constructing one or more network node probe packets, transmitting these probe packets through one of more in-band network hardware links using a probe processor. Further, an initialization processor may be used to establish communication channels between the first and the second centralized controllers, and in response to receiving probe packets, between the network node and the first or second centralized controllers.

The network system may have a link processor to enable switching between using in-band and out-of-band hardware links to communicate control information.

The network system may have an in-band control processor in a centralized controller which can combine control information and data information on a single in-band hardware link.

The network system may have an in-band control processor in the network node, which can distinguish between data and control information received on a common in-band hardware link.

Another implementation of the network system may distinguish between data and control information received on a common in-band hardware link by looking at the type of service (ToS) bits in a packet header.

The network system may also distinguish between data and control information received on a common in-band hardware link by associating control information with a specific TCP port number such that all packets received from that specific TCP port number are assumed to contain control information.

The network system may have a network node lookup table in a centralized controller that stores a list of network nodes that are functioning in a network domain.

The network system may have a centralized controller lookup table in a centralized controller that stores a list of other centralized controllers that are functioning in a network domain.

In another implementation of the system, a master controller is designated from the first and second centralized controllers in a domain, and the designated master controller may control all other centralized controllers and network nodes in the domain.

The network system may have one or more hardware network interfaces on the first and second centralized controller reserved for interfacing with out-of-band hardware links.

In another implementation, the network system may be used with network switches.

In yet another implementation, the network system may be used with network routers.

In another aspect, the systems and methods described herein include a method for improving network redundancy and for facile initialization in a centrally-controlled network. The method groups a first and a second centralized controller, in addition to a network node, in a domain. The network node is controlled by one or more of the first and second centralized controllers, wherein the network node is connected to the first and the second centralized controllers by a plurality of in-band hardware links. Further, the first and second centralized controllers are connected to one another by an out-of-band hardware link. The method constructs one or more probe packets to advertise the network address of the network node, and transmits the probe packets through one or more of the plurality of in-band hardware links using a probe processor. Further, the method sets up communication channels between the first and second centralized controllers, and between the network and the first or the second centralized controller, using an initialization processor.

The method switches between in-band and out-of-band hardware links for communicating control information using a link processor.

The method may combine data and control information on a common in-band link using an in-band control processor in the first or second centralized controller.

The method may differentiate between data and control packets by looking at the type of service (ToS) bits in the packet header.

The method may differentiate between data and control packets by receiving control information from a specific TCP port number.

The method may store a list of switches that are active in the domain in a switch lookup table.

In another implementation, the method stores a list of active centralized controllers in a centralized controller lookup table.

In another implementation, the method designates a master controller from the first and second centralized controllers, and the master controller is able to control all other centralized controllers and network nodes in the domain.

BRIEF DESCRIPTION OF THE DRAWINGS

The systems and methods described herein are set forth in the appended claims. However, for purpose of explanation, several embodiments are set forth in the following figures.

DETAILED DESCRIPTION

In the following description, numerous details are set forth for purpose of explanation. However, one of ordinary skill in the art will realize that the embodiments described herein may be practiced without the use of these specific details and that these details are not essential to the systems and methods described herein and that the actual details and features of the systems and methods will vary depending upon the application being addressed. In other instances, well-known structures and devices are shown in block diagram form to not obscure the description with unnecessary detail.

The systems and methods described herein include, among other things, a network topology system combining the use of in-band hardware links for network redundancy with out-of-band hardware links for facile initialization in a network with centralized control architecture, wherein the combined use of in-band and out-of-band hardware links reduces the overall number of hardware links used for centralized control.

A centrally-controlled network consists of a plurality of network switches and a plurality of centralized controllers controlling those switches. A network of switches and controllers may be broken down into domains, wherein a domain contains a subset of all controllers and switches, and a switch in a domain may be controlled by one or more controllers. An initialization processor configures out-of-band hardware links to be used to communicate control information between two centralized controllers, and in-band hardware links to communicate control information and data information on common hardware links between a controller and a switch, and between two switches, in addition to offering alternative network routes to communicate control information between two centralized controllers. In-band hardware links allow the same hardware links to convey both data and control communications, which offers increased control-connection redundancy in the event that one in-band hardware link becomes non-functional. Additionally, the in-band hardware links reduce the number of hardware links used by the network domain as a whole, while the use of a limited number of out-of-band hardware links to communicate only control information between two centralized controllers simplifies initialization of the centralized controllers.

Figure 1:
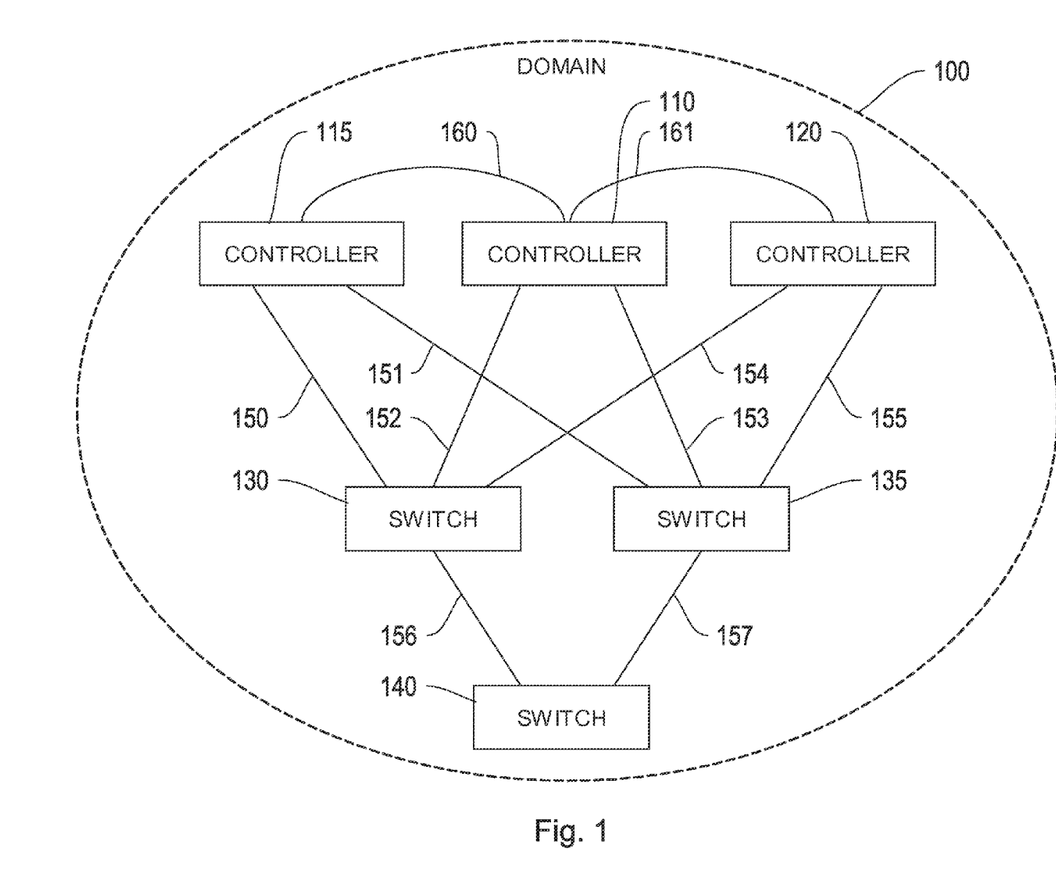
FIG. 1 is a schematic block diagram of a network domain of a centrally-controlled network environment which uses both in-band and out-of-band hardware, and in which some embodiments operate.

FIG. 1 is a schematic block diagram of a network domain of a centrally-controlled network environment which uses both in-band hardware links and out-of-band hardware links, and in which some embodiments operate. In particular, FIG. 1 depicts a domain 100, three controllers 110, 115, and 120, three switches 130, 135, 140, in-band data and control links 150-157, and out-of-band control links 160 and 161.

The network hardware depicted in FIG. 1 is part of a larger network of routers, switches, controllers, and interconnecting hardware links. Domain 100 is defined as a subset of this larger network of switches and centralized controllers, such that any centralized controller (110, 115, and 120) within domain 100 can control any switch (130, 135, and 140) in the domain 100. Furthermore, the three centralized controllers 110, 115, 120, and three switches 130, 135, 140 within domain 100 represent what may be a much larger network of hardware in domain 100.

Control information may include, for example, a request from switch 130 to centralized controller 110 for instructions related to an unknown flow of data packets. The control information may also include instructions from centralized controller 110 to switch 130 as to how to reprogram its on-board flow table, or information on the operational status and utilization of switch 130, which is communicated from switch 130 to centralized controller 110. Data information, in contrast to control information, is payload information that is communicated though network hardware, such as controllers 110, 115, and 120, and switches 130, 135, and 140.

A "packet" is a package of information that is used on layer 3 of the OSI model, and communicated between routers or switches (130, 135, or 140). Switches (130, 135, or 140) may also operate on layer 2 of the OSI model, and communicate information in "frames", but the terms "frame" and "packet" may be used interchangeably in the following description, since a frame is an encapsulation of a packet.

The network topology of FIG. 1 allows for increased network redundancy, in addition to simple initialization. The in-band hardware links 150-157 offer increased redundancy when compared to a network topology that uses one set of hardware links to convey data information between network nodes, and a separate set of hardware links to convey control information between a network node and a controller. In such a network, for example, a dedicated control link may be used between switch 130 and controller 115. If this dedicated out-of-band control link fails, switch 130 is no longer reachable to control information. In contrast, the network topology of FIG. 1 offers increased redundancy in the event that one or more in-band hardware links fail. For example, if in-band link 150 connecting controller 115 with switch 130 fails, control information can be re-routed around the defective hardware link using, in this case, in-band link 151, in-band link 157, and in-band link 156.

Network domain 100 depicts a network topology that uses out-of-band (OOB) hardware links 160 and 161 only between centralized controllers 110, 115, and 120. The out-of-band hardware links 160 and 161 may be used for bootstrapping, or initialization of communication channels between the controllers 110, 115, and 120, wherein this initialization process is described in further detail in relation to FIG. 2. Further, the out-of-band hardware links 160 and 161 may be used to communicate global routing decisions between controllers 110, 115, and 120, in addition to communicating to other controllers in other domains, information about the topology, utilization, and operational status of the hardware in domain 100.

In one implementation, a master controller is designated once an initialization procedure has been carried out to establish communication between controllers 110, 115, and 120 across out-of-band links 160 and 161. The distinction between a master controller and the other controllers in the domain 100 (referred to as secondary controllers) is based on a software process that allows a master controller to make control decisions that affect secondary controllers. This software process may be present on all controllers, but only implemented by the designated master controller.

Figure 2:
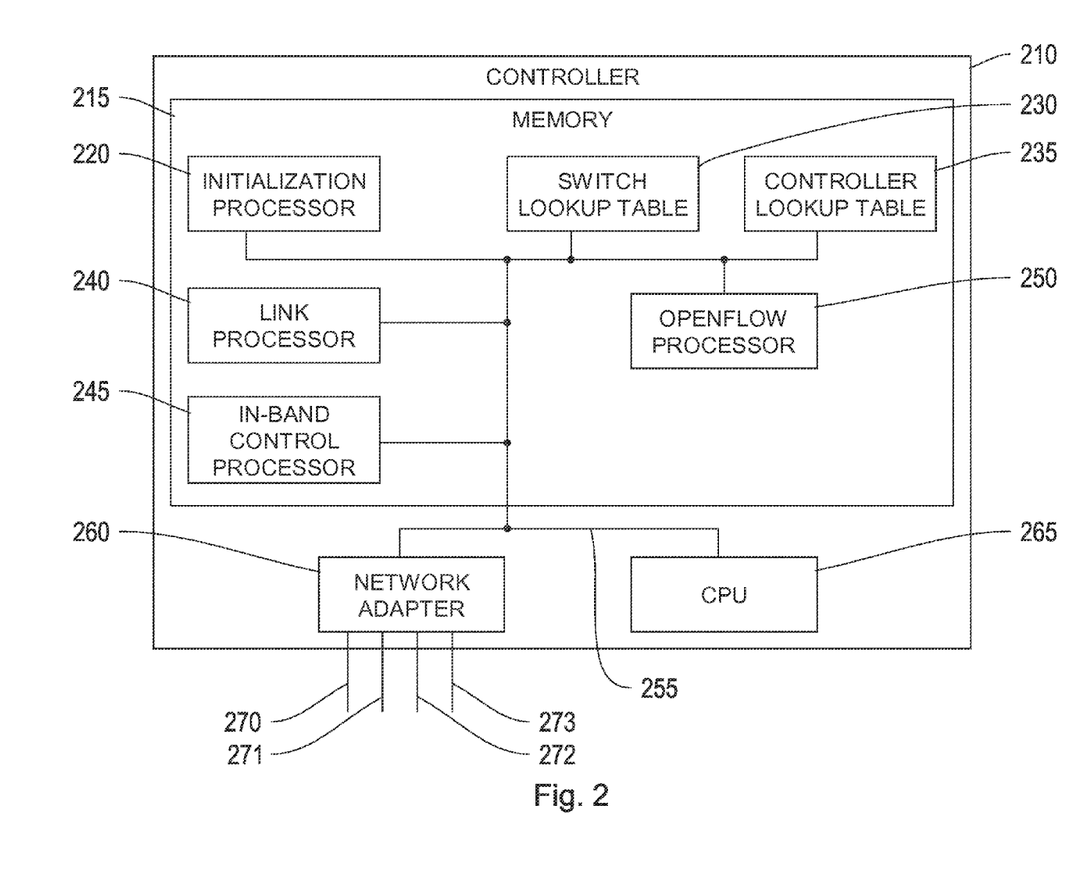
FIG. 2 is a schematic block diagram of a controller.

The designation of a controller, for example controller 110, as a master controller may result from designation policies, including the controller 110 being powered on earlier than the other controllers 115, and 120. Initialization processors 220 associated with controllers 110, 115, and 120 may store timestamps of the time that the respective controllers were powered on. In one implementation, the timestamp stored in initialization processor 220 of controller 110 may be older than that of controllers 115 and 120, and controller 110 is designated as master controller 110 by both the initialization processor 220 associated with controller 110 and the initialization processors 220 associated with controller 115 and 120.

In another implementation of the designation policies, controller 110, for example, may be designated as the master controller 110 due to a default value stored in its corresponding initialization processor 220, wherein this default value is different from the default value stored in the initialization processors 220 associated with controllers 115 and 120. In yet another implementation, controller 110, may be randomly designated as master controller 110 once communication has been established between two or more of the initialization processors 220 in controllers 110, 115, and 120. Once a controller has been designated as the master controller 110 within domain 100, all other controllers 115 and 120 default to a secondary controller designation.

The network topology depicted in FIG. 1 further allows a reduced amount of link hardware to implement a centrally-controlled network. The three controllers 110, 115, and 120, and three switches 130, 135, and 140 use eight in-band links 150-157 and two out-of-band links 160 and 161. In contrast, the same number of network nodes, when connected using conventional means, may employ direct and dedicated control links between each controller and each network node, and require up to eighteen data and control links A typical network domain may include tens or hundreds of network nodes similar in form and functionality to network switches 130, 135, and 140, and the systems and methods described herein may result in significant savings in terms of the capital and maintenance costs of network link hardware used to implement control and data connectivity.

FIG. 2 is a schematic block diagram of a controller 210. Controller 210 is adapted to combine in-band hardware links for network redundancy with out-of-band hardware links for facile initialization of communication channels between network nodes. Further, the combined use of in-band and out-of-band hardware links reduces the overall number of hardware links used for centralized control.

Controller 210 includes a memory 215, an initialization processor 220, a switch lookup table 230, a controller lookup table 235, a link processor 240, an in-band control processor 245, an OpenFlow processor 250, a network adapter 260, which, in this exemplary implementation, is embodied with four hardware interfaces 270-273, and a central processing unit (CPU) 265, and wherein the aforementioned elements are connected by data bus 255.

Controller 210 is similar to controllers 110, 115, and 120 from FIG. 1, and is essentially a computer, adapted for the purposes of remotely controlling network hardware switches. The controller's actions are governed by a CPU 265, which may represent a plurality of processing cores. The hardware interfaces between the controller 210 and other network nodes are accommodated by the network adapter 260, wherein the network adapter 260 comprises the mechanical, electrical and signaling circuitry to connect the controller 210 to other network nodes. Network adapter 260 may represent a plurality of network adapters, and the four hardware interfaces 270-273 depicted may represent a larger array of interfaces. Furthermore, an interface (270-273) may optionally connect to a dedicated out-of-band hardware link, or an in-band hardware link.

Memory 215 comprises storage locations that are addressable by CPU 265 and adapters for storing software program code and data. The memory 215 may comprise a form of random access memory (RAM) that is generally cleared by a power cycle or other reboot operation (e.g., it is a "volatile" memory). In other embodiments, however, the memory 215 may be a non-volatile memory that does not require power to maintain information. The CPU 265 and adapters may, in turn, comprise processing elements and/or logic circuitry configured to execute the software code and manipulate the data stored in the memory 215.

OpenFlow processor 250 includes the OpenFlow protocol for centralized control of a plurality of network switches, as recited by OpenFlow.org. Using the OpenFlow processor 250, the controller 210 can remotely program switch forwarding tables, send packets on any switch port, and receive packets from any switch port, among other things.

Initialization processor 220 is configured to execute an initialization, or bootstrapping process. In one implementation, the initialization processor 220 stores a list of one or more reserved hardware interface port numbers 270-273 at which controller 210 is configured to receive control packets directly from other controllers in its network domain. The initialization process may be triggered by receipt of one or more controller probe packets at one or more of these stored interface port numbers. For example, when controllers 110 and 115 are first powered on and connected together by out-of-band link 160, controller 115 may receive one or more controller probe packets at a hardware interface port number reserved for control packets directly from other controllers.

In one implementation, the initialization processor 220 in controller 115 may execute a packet recognition process to determine that a received packet is a controller probe packet, by cross-referencing the hardware interface port number that received the packet, with the list of reserved ports. In another implementation, the packet recognition process determines that a received packet is a controller probe packet by reading the packet header, wherein the packet header will have distinct type of service (ToS) bits identifying the packet as a controller probe packet.

Controller probe packets are constructed by the initialization processor 220 in each respective controller 110, 115, and 120 in a domain 100, and identify the IP address from which they are sent. The initialization processor 220 executes a process to periodically construct and send controller probe packets out to those reserved port numbers saved in initialization processor 220, whether or not a communication channel to another controller is known to have been setup on any of the reserved port numbers already.

In response to receiving one or more controller probe packets, the initialization processor 220 executes an active-controller search process, wherein the initialization processor 220 reads the address of the sender controller associated with the received controller probe packet, and cross-references it the address with those stored in the controller lookup table 235. If no entry is present in the controller lookup table 235, the active-controller search process stores the new controller address in the controller lookup table 235, in addition to a timestamp corresponding to the time of receipt of the probe packet, and executes a flow-update process. If, however, an entry already exists in the controller lookup table 235 corresponding to the address from which the received controller probe packet was sent, the saved timestamp associated with the entry in the controller lookup table 235 is updated to reflect the time of receipt of this new probe packet. In such instances, the controller probe packet may be referred to as a keep-alive packet.

The initialization processor 220 may also execute a process to periodically check the timestamps associated with the controller entries stored in the controller lookup table 235. After a predetermined time-out period without receipt of a keep-alive packet from a controller, the initialization processor 220 deletes the associated entry in the controller lookup table 235, and executes a flow-update process. Note that a flow-update process is described further on in this document.

Figure 3:
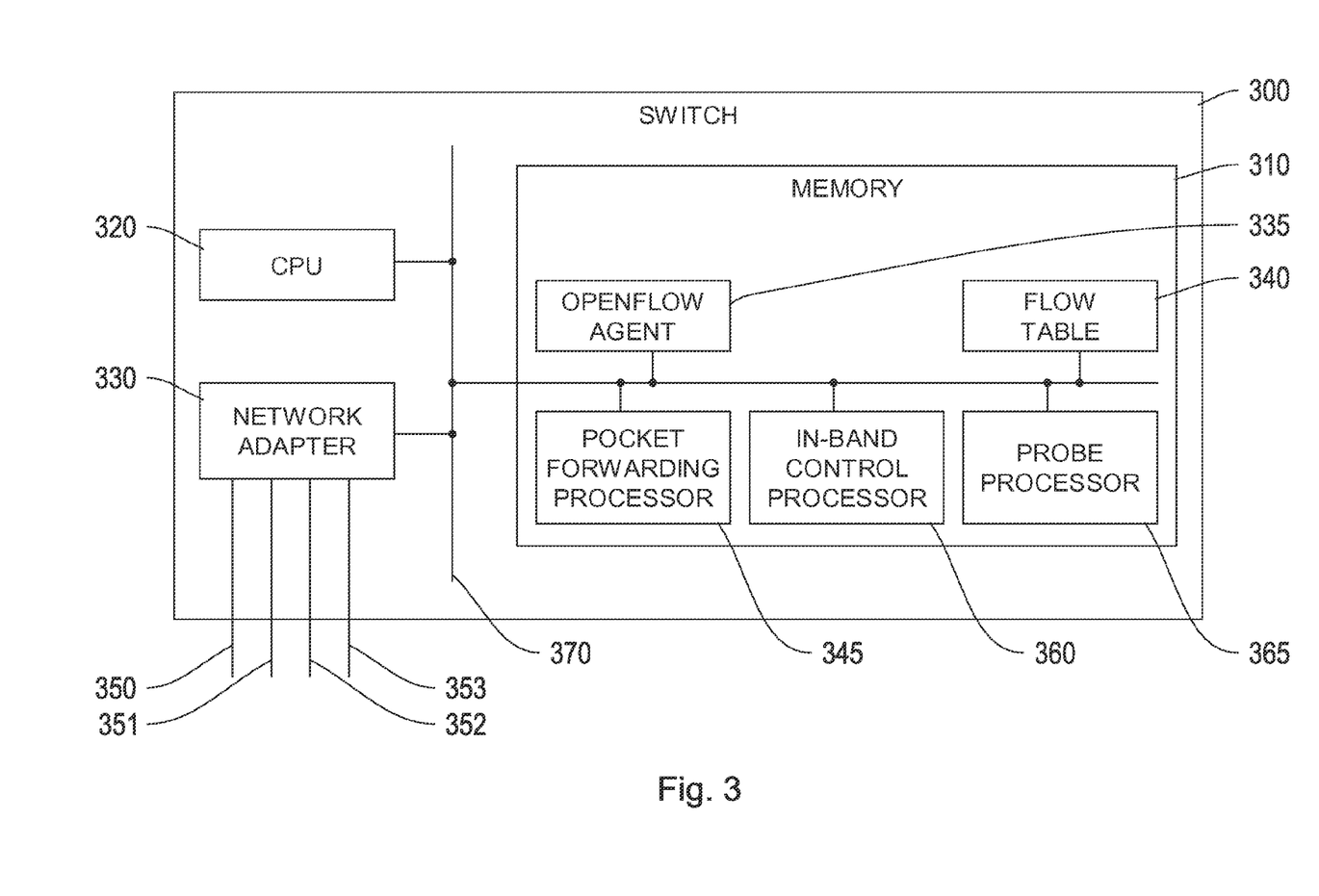
FIG. 3 is a schematic block diagram of a centrally-controlled switch.

In one practice, it is assumed that a switch, when powered on, will periodically send out probe packets on all connected hardware links using a probe processor 365, as described in relation to FIG. 3. The switch probe packets may be sent as a broadcast message, and referred to as broadcast probe packets. In one implementation, these broadcast probe packets are constructed and sent by the probe processor 365 as IP packets addressed to a predefined range of IP addresses. This range of IP addresses encompasses all possible IP addresses within the network domain of which the switch is a part. In another implementation, the broadcast probe packets may be sent as a conventional "limited broadcast" to IPv4 address "255.255.255.255". In yet another implementation, the broadcast probe packets may be sent to IPv6 address "ff02::1", which is a multicast address for IPv6 that is equivalent to a broadcast address for IPv4. The broadcast probe packets contain, among others, the IP address of the sender, such that they advertise the network address as an identifier of their sender. The broadcast probe packets may additionally contain the IP addresses of all the network destinations reachable from the sender network node. In another practice, the probe processor 365 may construct and send out switch probe packets as unicast messages.

In certain implementations, a controller 210 includes an in-band control processor 245. An in-band control processor 245 may be used to combine control and data information on a common physical channel, or link. The in-band control processor 245 may be used to identify an incoming packet as a data packet or a control packet, and to insert a control packet into a data packet stream, wherein a stream is a series of data packets. If a packet is identified as a control packet, the in-band control processor 245 passes it to the initialization processor 220.

The in-band control processor 245 may identify packets by executing a packet recognition process. In one implementation, this packet recognition process reads the packet header, wherein the packet header will have distinct type of service (ToS) bits identifying the packet as data or control information. The in-band control processor 245 may also distinguish between data and control packets by sending control packets between two specific TCP port numbers on the sender and recipient network nodes.

The initialization process, executed by the initialization processor 220 in controller 210, may be triggered by receipt of one or more switch probe packets received on one of the unreserved hardware interface port numbers 270-273. The information contained in these probe packets includes a source address, which is the address of the sending switch. This allows the receiving controller 210 to save the addresses of accessible switches in the switch lookup table 230.

OpenFlow processor 250 may setup a communication channel from controller 210 to a switch 300 from which one or more control packets is received, wherein OFA 250 communicates with a respective OpenFlow Agent (OFA) 335 in the switch 300 (as described in relation to FIG. 3). The communication channel may be authenticated by the initialization processor 220 using a cryptographic protocol, such as secure sockets layer (SSL), and communication across the communication channel may be handled using conventional OpenFlow methodology, as recited by OpenFlow.org.

The probe packets, constructed by a probe processor 365 in a switch 300, may also include a list of network destinations reachable from the switch 300. After controller 210 sets up a communication channel to a switch 300 from which one or more probe packets was received, it may read this network destination information, and store it in a global routing table in OpenFlow processor 250. Using this global routing table, OpenFlow processor 250 can save updated flows to a flow table 340 on a switch 300, and execute processes to make routing decisions in response to a switch 300 passing a packet to controller 210 if it does not have a flow entry associated with packets of that same type stored in its flow table 340.

In response to storing a new network node address in switch lookup table 230 or controller lookup table 235, the initialization processor 220 executes a flow-update process. During the flow-update process, the initialization processor 220 communicates with the OFA 250 to store updated flows into the flow tables 340 of the switches 300 stored in switch lookup table 230.

A "flow" is a network traffic path with certain characteristics to which a switch 300 responds. These network traffic paths, or flows, include, among others: (i) a specific transmission control protocol (TCP) connection, (ii) all packets from a particular MAC address or IP address, (iii) all packets with the same VLAN tag, (iv) all packets from a particular same switch port, or (v) all packets matching a specific header. Flows are described in greater depth by McKeown et al., OpenFlow: Enabling Innovation in Campus Networks (www.openflow.org, March 2008).

During a flow-update, the initialization processor 220 installs a flow entry in the flow table 340 of a switch 300, wherein the flow entry includes a flow leading towards each controller in the controller lookup table 235. As a result, the switch 300 can relay network traffic to all other controllers known to the controller 210 performing the flow-update.

In order to improve fault-tolerance, a flow-update may optionally install multiple different network paths in the flow table 340 of a switch towards a controller from the controller lookup table 235. If one path fails in an attempt to communicate with an associated controller, OpenFlow default processes will automatically attempt to use one of the other stored paths.

The initialization process, upon establishing connectivity between the two controllers, may designate one as a master controller, according to designation policies previously described. The designation of a controller is stored by initialization processor 220 in memory 215. For example, and with regard to FIG. 1, controller 110 may be designated master controller 110, and controllers 115 and 120 default to secondary controllers. If, however, further controllers are discovered in domain 100, or if controller 110 experiences an error or failure, this designation may be updated.

Domain 100 may be connected to other domains using one or more in-band links (similar to in-band links 150-157 from FIG. 1). This connectivity with one or more other domains may establish a distributed routing implementation involving a domain having a master controller, for example, master controller 110. Master controller 110 can control all other nodes in a domain, including switches 130, 135, 140, and secondary controllers 115 and 120 in domain 100.

Master controller 110 allows the domain 100 to have the behavior of a single router upon connection to another domain, such that another domain can send packets into domain 100 to a single location; the master controller 110, without having to consider interconnections between the network nodes (switches 130, 135, 140, and secondary controllers 115 and 120) in domain 100.

Controller 210 further includes link processor 240 for switching between in-band and out-of-band hardware links for control communication, and for implementing communication processes that prioritize the use of either in-band hardware links or out-of-band hardware links. In one embodiment, the communication processes are rules stored in link processor 240, and include prioritizing the use of out-of-band hardware links, such as out-of-band links 160-161, for control communication, unless an out-of-band hardware link 160 or 161 has failed. In another implementation, communication processes include instructions to use in-band links 150-157 by default to send control information from one controller to another controller. An example of this may include the use of in-band hardware links 151 and 153 connecting through switch 130 between controller 115 and controller 110 to carry control information. In yet another implementation, communication processes periodically switch back and forth between using in-band and out-of-band hardware links for control information communication, such that continuous failure testing of both hardware link types is carried out during network operation.

FIG. 3 is a schematic block diagram of a switch 300, similar to switches 130, 135, and 140 from FIG. 1. In particular, FIG. 3 depicts a switch 300 that may be used in a centrally-controlled network, and includes, among others, a memory 310, a CPU 320, a network adapter 330 with four network hardware interfaces 350-353, an OpenFlow agent 335, a flow table 340, a packet forwarding processor 345, an in-band control processor 360, and a probe processor 365, all linked by data bus 370.

Switch 300 is configured to be used in a centrally-controlled network, such as domain 100 from FIG. 1, and to receive data and control information on a single in-band hardware link, such that domain 100 as a whole can increase its redundancy, and reduce its network hardware.

A network switch 300 is essentially a computer, adapted to transmit data between client computers in a network. The switch's 300 actions are governed by a CPU 320, which may represent a plurality of processing cores. The hardware interfaces between the switch 300 and other nodes are accommodated by the network adapter 330, where a network adapter 330 comprises the mechanical, electrical and signaling circuitry to connect the switch 300 to other network nodes. Network adapter 330 may represent a plurality of network adapters, and the four hardware interfaces 350-353 depicted may represent a larger array of interfaces, where an interface connects to an in-band hardware link.

Memory 310 comprises storage locations that are addressable by CPU 320 and adapters for storing software program code and data. The memory 310 may comprise a form of random access memory (RAM) that is generally cleared by a power cycle or other reboot operation (e.g., it is a "volatile" memory). In other embodiments, however, the memory 310 may be a non-volatile memory that does not require power to maintain information. The CPU 320 and adapters may, in turn, comprise processing elements and/or logic circuitry configured to execute the software code and manipulate the data stored in the memory 310.

OpenFlow agent 335 replaces an on-switch control plane, and allows for communication between the switch 300 and the OpenFlow processor 250 in a centralized control server, such as controller 210. On-switch decisions as to how to handle a given data flow are made in consultation with the flow table 340, where the flow table 340 stores flow entries, which associate a flow with an action. There are three basic actions that a switch adhering to the OpenFlow protocol must support, as recited by McKeown et al., OpenFlow: Enabling Innovation in Campus Networks (openflow.org, March 2008), including: (1) Forwarding a flow's packets to a given port, or ports. (2) Encapsulating and forwarding a flow's packets to a controller. Typically this is used for the first packet in a new flow to allow the controller, such as controller 210, to decide if the flow should be added to the flow table 340. (3) Dropping a flow's packets.

Upon instruction by the controller 210, a new entry can be saved in the flow table 340, which associates an action, to be carried out by switch 300, with a given flow. More particularly, a flow entry in the flow table 340 includes three fields: (1) a packet header that defines the flow, (2) an action to be carried out on the packets that make up a flow, and (3) statistics that keep track of the number of packets and bytes for each flow, and the time since the last packet matched the stored flow. This time can be used to remove inactive flows from flow table 340.

Switch 300 has an in-band control processor 360 that allows it to identify an incoming packet as a data packet or an information packet by looking at the packet header. The packet header will have distinct type of service (ToS) bits identifying the packet as data or control information. Alternatively, the in-band control processor 360 may distinguish between data and control packets by sending control packets between two specific TCP port numbers on the sender and recipient network nodes.

Switch 300 has a probe processor 365, which will, when switch 300 is powered-on and physically connected by a hardware link to another network node, periodically send out probe packets on all connected hardware links identifying itself, and wherein the identification may be in the form of the IP address associated with the switch 300. These probe packets are used in the initialization process carried out by a controller 210, and described in relation to FIG. 2. Additionally, the probe packets may contain a list of all network destination IP addresses reachable from switch 300.

A packet, arriving at an interface, such as interface 350 of switch 300, is received by the in-band control processor 360. It is this in-band control processor 360 that allows the switch 300 to be indirectly connected to controller 210, and to use a common hardware link to communicate data and control information. The in-band control processor 360 executes a process to determine the type of packet received at the interface. If the packet is a control packet, it is passed to the OpenFlow agent 335, and the OpenFlow agent 335 interprets the control information within the packet.

If a packet is identified as a data packet by the in-band processor 360, it is passed to the packet forwarding processor 345. In response, the packet forwarding processor 345 reads the destination address of the data packet. If there is a cached flow entry corresponding to the destination address of the data packet in the flow table 340 of the switch 300, then the forwarding rules associated with that flow entry are carried out on the packet. If, however, no flow entry exists for the packet received, the packet forwarding processor 345 executes an exception process, and the packet forwarding processor 345 uses the OpenFlow agent 335 to request information from controller 210 as to how to process packets of this new type. The controller 210 returns a forwarding decision to the switch 300, which is carried out on the packet by the packet forwarding processor 345, and cached in the flow table 340 for future packets of that same type.

Figure 4:
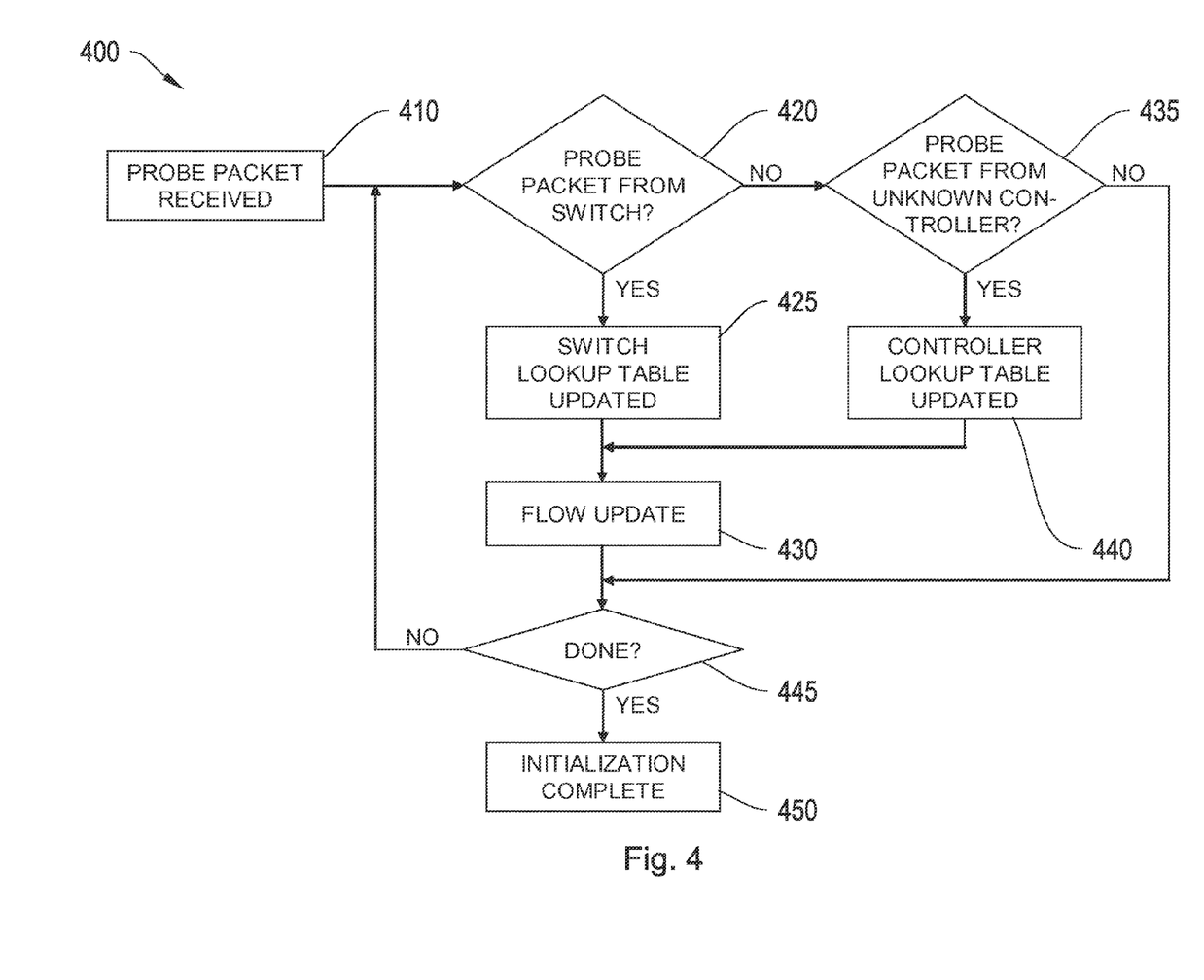
FIG. 4 is a flow chart diagram of a network initialization process.

FIG. 4 is a flow chart diagram of a network initialization process 400. The initialization process 400 is carried out by a controller, which may be controller 110 from FIG. 1, and wherein the initialization process 400 may be carried out by controller 110 independently of initialization processes carried out by controllers 115 and 120. The process 400 starts at step 410 with the receipt, by initialization processor 220, of a packet. In response, and at step 420, the initialization processor 220 determines if the packet is a probe packet from a switch or another controller. This determination is made, in one implementation, by executing a packet recognition process that reads the particular type of service (ToS) bits in the header of the received packet and checks the hardware interface port number that received the packet. If the received packet is from a switch, the process proceeds to step 425, and the initializing controller updates its switch lookup table. If, however, the probe packet is not from a switch, then the process proceeds to step 435, and the initialization processor 220 determines whether the probe is from another controller. The initialization processor 220 may make this determination by cross-referencing the port number in receipt of the packet with a stored list of interface port numbers reserved for control packets. If the probe is from another controller, the initializing controller updates its controller lookup table at step 440 to include the new controller.

Step 430 is a flow update, as described in relation to FIG. 2, wherein in response to receiving a probe packet from a new controller or switch, controller 110 saves updated flows into the flow tables of known network nodes from its switch lookup table 230, and controller lookup table 235.

Step 445 depicts a check to determine if the initialization process is complete, wherein the initialization process may be considered complete if no probe packets are received by controller 110 within a specified timeout period. If a probe packet is received before the timeout period has elapsed, the process proceeds to step 420, and continues as previously described. It is noted, however, that the initialization process may complete at step 450, but subsequently the controller may receive a probe packet, such as when new hardware is added to a network. In such instances, the initialization processor executes process 400, as before.

Figure 5A:
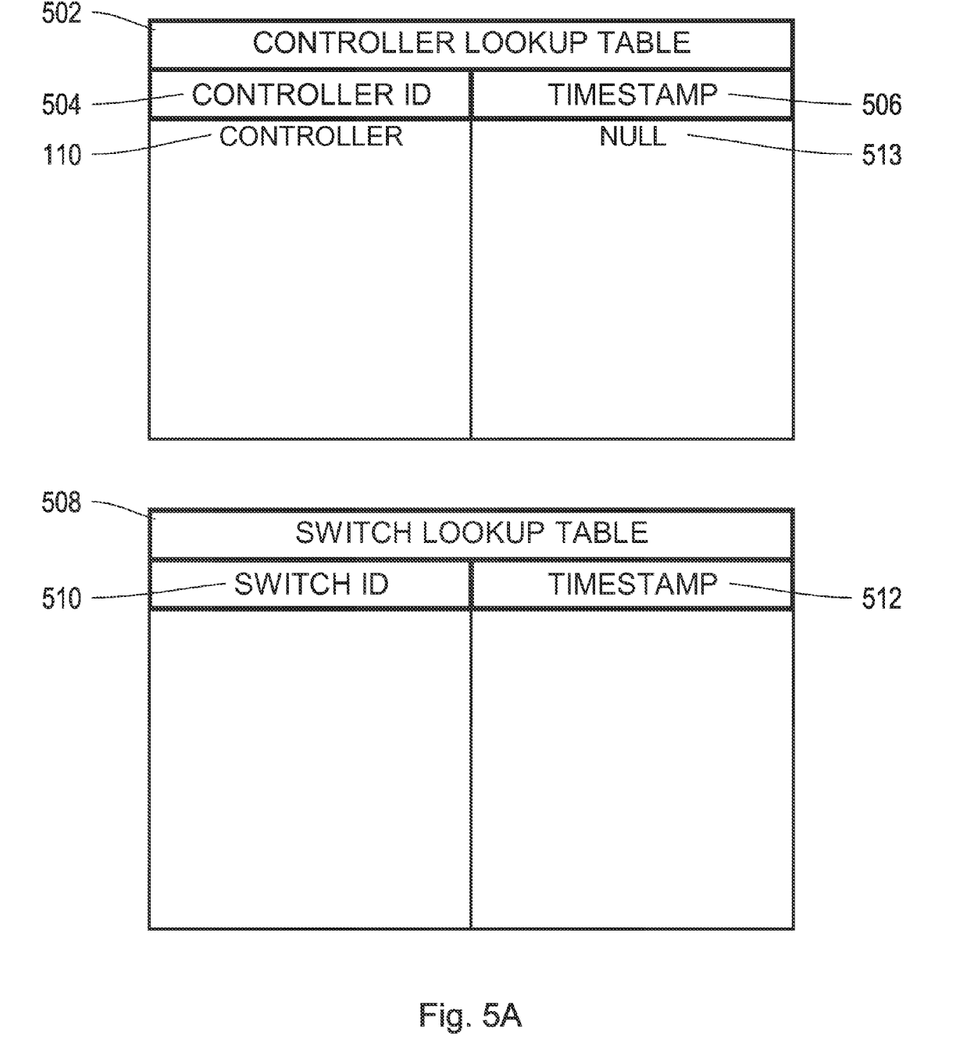
FIGS. 5A-5D depict a sequence of steps carried out during a network initialization process to store network domain topology in a controller lookup table and switch lookup table.

FIGS. 5A-5D depict a sequence of steps carried out during a network initialization process to store network domain topology. In particular, FIG. 5A depicts a controller lookup table 502, and a switch lookup table 508, as described in relation to controller 110 from FIG. 2, wherein controller lookup table 502 is similar to controller lookup table 235 from FIG. 2, and switch lookup table 508 is similar to switch lookup table 230 from FIG. 2. In the example that follows, an initialization process may be executed by an initialization processor 220 in controller 110.

Controller lookup table 502 stores a controller ID 504 associated with another controller that controller 110 has established a communication channel with. This controller ID 504 may be, in one implementation, the IP address of the respective controller. Additionally, the controller lookup table 502 stores a timestamp 506 corresponding to the time of receipt of the last probe packet from the respective stored controller ID. Similarly, switch lookup table 508, stores a switch ID 510 of a switch to which controller 110 has established a communication channel with, in addition to an associated timestamp 512 corresponding to the time of last receipt of a probe packet from the respective saved switch ID.

Timestamps 506 and 512 are updated upon receipt of a probe packet from a source network node already stored in the respective controller lookup table 502 or switch lookup table 508, and may be used to remove a controller or a switch from the controller lookup table 502 or switch lookup table 508 if a predetermined time interval elapses without receipt of a respective probe packet.

FIG. 5A depicts the start of the initialization process by the initialization processor 220 in controller 110, wherein the controller 110 is not aware of any other network nodes in domain 100, and consequently, only has a reference to itself in controller lookup table 502, and has no stored references in switch lookup table 508. The timestamp 513 associated with the controller 110 entry in controller lookup table 502 is saved as a null value, by default.

Figure 5B:
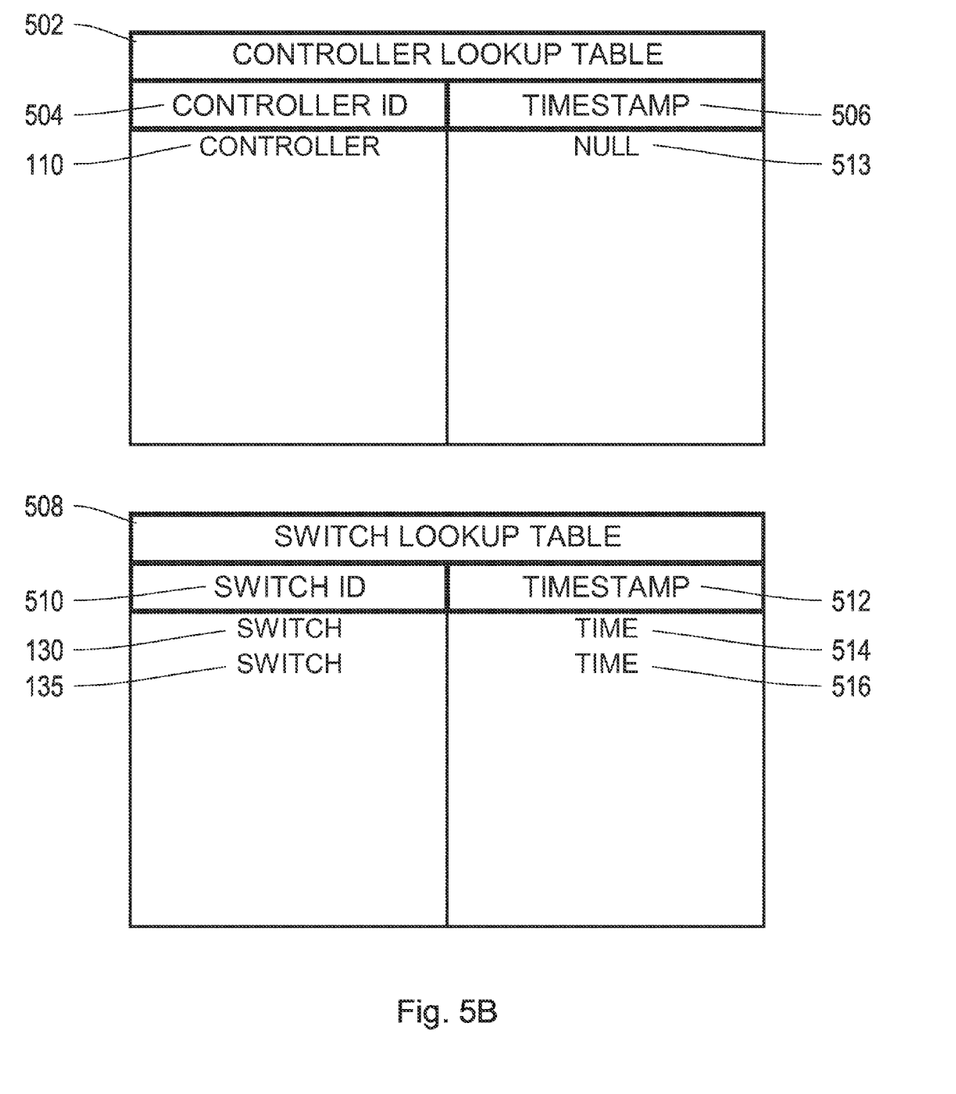

FIG. 5B depicts controller lookup table 502, and switch lookup table 508 after controller 110 has received probe packets from switch 130 and switch 135. In particular, the probe packets are received by the initialization processor 220 in controller 110, and a reference to the switches 130 and 135 is stored in switch lookup table 508 with respective timestamps time 514 and time 516.

Figure 5C:
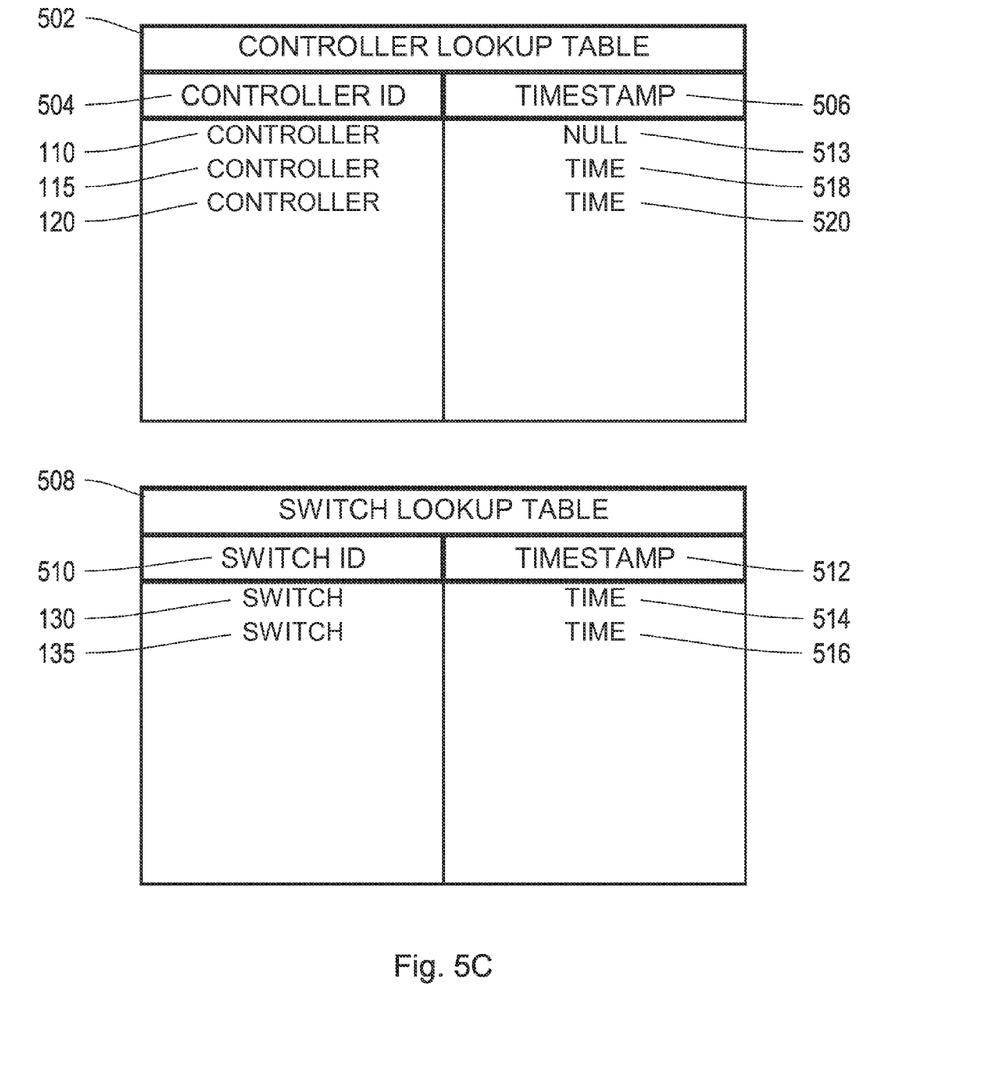

At any point during the initialization process, controller 110 may receive probe packets from a controller, wherein probe packets from another controller may be primarily sent across out-of-band links 160, but may also be sent through in-band links 150-157. Upon receipt, by controller 110, of a probe packet from a controller, a reference to the unrecognized controller is added to the controller lookup table 502. FIG. 5C depicts the initialization process after controller 110 receives probe packets from controllers 115 and 120, wherein references to controller 115 and controller 120 have been stored in controller lookup table 502, along with respective associated timestamps 518 and 520.

Figure 5D:
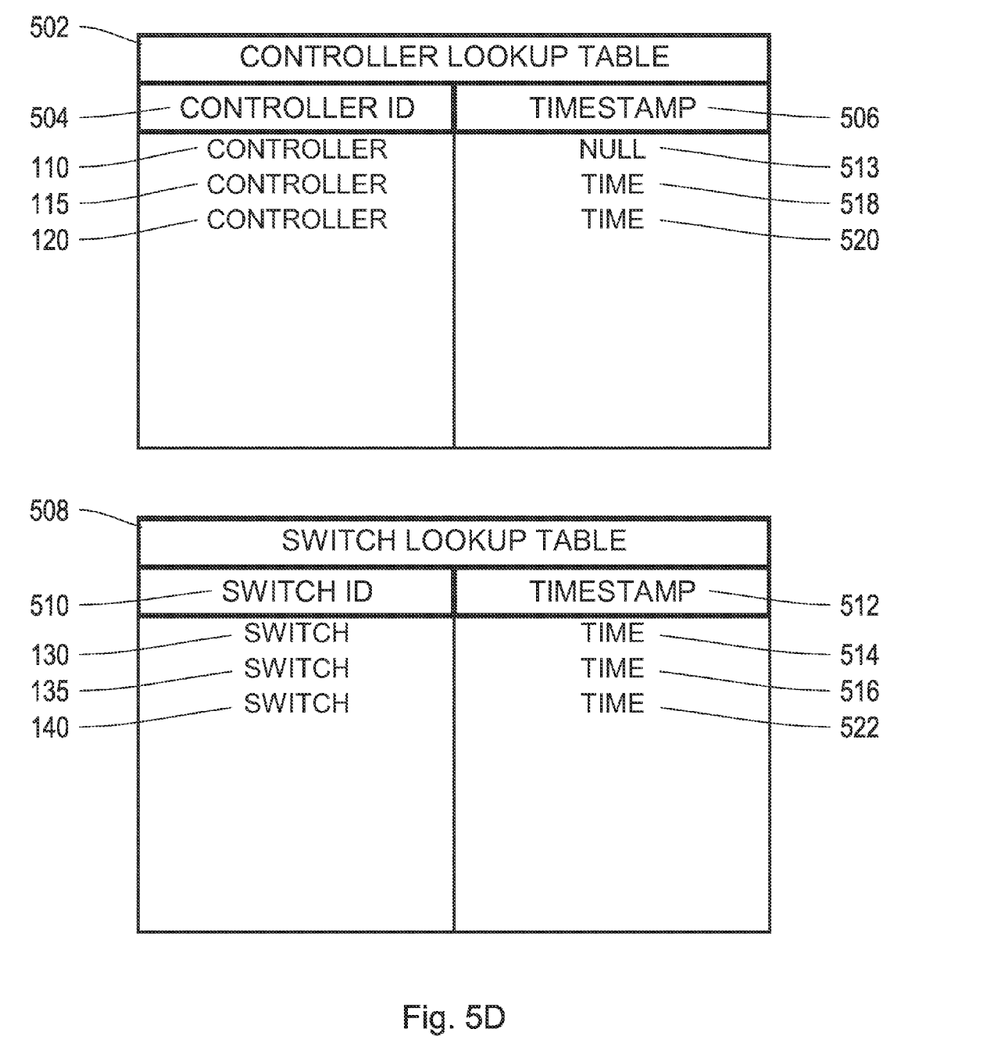

FIG. 5D depicts the completion of the initialization process for controller 110 in domain 100 from FIG. 1. Controller 110 has received probe packets from switch 140, and in response, the address of switch 140 and an associated timestamp 522 have been saved into switch lookup table 508, such that all network nodes in domain 100 are recorded in controller lookup table 502 and switch lookup table 508.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include, without limitation, device drivers, operating systems, and user applications. Ultimately, such computer readable media further includes software instructions for performing embodiments described herein. Included in the programming (software) of the general-purpose/specialized computer or microprocessor are software modules for implementing some embodiments.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A network system, comprising;
a network domain having a first centralized controller and a second centralized controller each controlling a network node;
a plurality of in-band network hardware links including a first set of links connecting the first centralized controller to the network node, and a second set of links connecting the second centralized controller to the network node, wherein the network node uses the in-band network hardware links for communication of data;
an out-of-band network hardware link connecting the first centralized controller to the second centralized controller;
a probe processor configured to construct one or more network node probe packets that advertise a network node identifier, and to transmit the network node probe packets through one or more of the plurality of in-band network hardware links;
an initialization processor configured to:
establish one or more out-of-band communication channels between the first and second centralized controllers using the out-of-band network hardware link to communicate control information, and
receive one or more of the network node probe packets, and in response, to establish one or more in-band communication channels between the first or the second centralized controller and the network node through the plurality of in-band network hardware links, wherein the in-band communication channels are used for communication of control information between the first centralized controller and the second centralized controller; and
a link processor configured to switch between the in-band communication channels and the out-of-band communication channels for communicating control information between the first and the second centralized controllers subsequent to initialization.

2. The network system according to claim 1, wherein the link processor is at one of the first centralized controller or the second centralized controller.

3. The network topology system according to claim 1, wherein the link processor uses a communication policy to prioritize between the use of in-band network hardware links or the use of out-of-band network hardware links for communication of control information.

4. The network system according to claim 1, further comprising an in-band control processor in the first centralized controller configured to combine data and control information on an in-band hardware link.

5. The network system according to claim 1, further comprising an in-band control processor in the network node configured to distinguish between data and control information received on a common in-band hardware link.

6. The network system according to claim 5, wherein the in-band control processor distinguishes between data and control information by looking at one or more type of service (ToS) bits in a packet header.

7. The network system according to claim 5, wherein the in-band control processor distinguishes between data and control information by associating control information with a specific TCP port number such that all packets received from that specific TCP port number are assumed to contain control information.

8. The network system according to claim 1, further comprising a network node lookup table in the first centralized controller configured to store a list of active network nodes in the network domain.

9. The network system according to claim 1, further comprising a centralized controller lookup table in each of the first and the second centralized controllers, storing a list of the active centralized controllers in the network domain.

10. The network system according to claim 1, further comprising a master controller designated from the first and the second centralized controllers, wherein the master controller controls the network node and the non-designated of the first and second centralized controllers.

11. The network system according to claim 1, further comprising one or more network hardware interfaces on each of the first and the second centralized controllers reserved for interfacing with out-of-band network hardware links.

12. The network system according to claim 1, wherein the plurality of network nodes include network switches.

13. The network system according to claim 1, wherein the plurality of network nodes include network routers.

14. A method of improving network redundancy, and for facile initialization in a centrally-controlled network, comprising;
grouping a first centralized controller, a second centralized controller, and a network node into a network domain;
controlling the network node from at least one of first and the second centralized controllers;

connecting the first centralized controller and the second centralized controller to the network node using a plurality of in-band network hardware links;

connecting the first centralized controller to the second centralized controller using an out-of-band network hardware link;

constructing, using a probe processor, one or more network node probe packets that advertise a network node identifier;

transmitting, using the probe processor, one or more network node probe packets through one or more of the plurality of in-band network hardware links;

establishing, using initialization processors in the first and the second centralized controllers, one or more out-of-band communication channels between the first and the second centralized controllers using the out-of-band network hardware link to communicate control information;

receiving, by the initialization processor in the first or the second centralized controller, one or more network node probe packets, and in response, establishing one or more in-band communication channels between the first and the second centralized controller using one or more in-band network hardware links to the network node to communicate control information; and switching, by a link processor, between the in-band and an out-of-band communication channels for communicating control information between the first and the second centralized controllers subsequent to initialization.

15. The method according to claim 14, further comprising combining data and control information on a common in-band hardware link using an in-band control processor in the first centralized controller.

16. The method according to claim 15, wherein the in-band control processor distinguishes between data and control information by reading one or more type of service (ToS) bits in a packet header.

17. The method according to claim 15, wherein the in-band control processor distinguishes between data and control information by associating control information with a specific TCP port number such that all packets received from that specific TCP port number are assumed to contain control information.

18. The method according to claim 14, further comprising storing a list of network nodes active in the network domain in a network node lookup table in the first centralized controller.

19. The method according to claim 14, further comprising storing a list of centralized controllers active in the network domain in a centralized controller lookup table in the first centralized controller.

20. The method according to claim 14, further comprising designating a master controller from the first and the second centralized controllers, wherein the master controller controls the network node and the non-designated of the first and second centralized controllers.

21. The method of claim 14, wherein the link processor uses a communication policy to prioritize between the use of in-band network hardware links or the use of out-of-band network hardware links for communication of control information.

* * * * *